United States Patent [19]
Arnold et al.

[11] Patent Number: 5,368,330
[45] Date of Patent: Nov. 29, 1994

[54] MOTOR VEHICLE STEERING COLUMN

[75] Inventors: Hans Arnold, Lage; Manfred Breuer, Halle/Westfallen, both of Germany

[73] Assignee: Reiche & Co., Lage, Germany

[21] Appl. No.: 67,865

[22] Filed: May 26, 1993

[30] Foreign Application Priority Data

Jun. 3, 1992 [DE] Germany ............... 9207473[U]
Apr. 20, 1993 [DE] Germany ............... 9305830[U]

[51] Int. Cl.⁵ .................................. B62D 1/19
[52] U.S. Cl. ....................... 280/777; 74/493; 280/775
[58] Field of Search ............... 280/775, 777; 74/493, 74/500

[56] References Cited

U.S. PATENT DOCUMENTS

| | | | |
|---|---|---|---|
| 3,508,633 | 4/1970 | Nishimura et al. | 280/777 |
| 3,980,314 | 9/1976 | Köpf | 280/777 |
| 5,193,848 | 3/1993 | Faulstroh | 280/777 |

*Primary Examiner*—Kenneth R. Rice
*Attorney, Agent, or Firm*—Darby & Darby

[57] ABSTRACT

A steering column for a vehicle having an outer housing fixedly mounted to the vehicle with a corrugated tubular section which is compressible upon application of axial force. A reinforcing sleeve is mounted to the outer housing with a sliding fit. The collapsible outer housing is supported by the reinforcing sleeve.

13 Claims, 3 Drawing Sheets

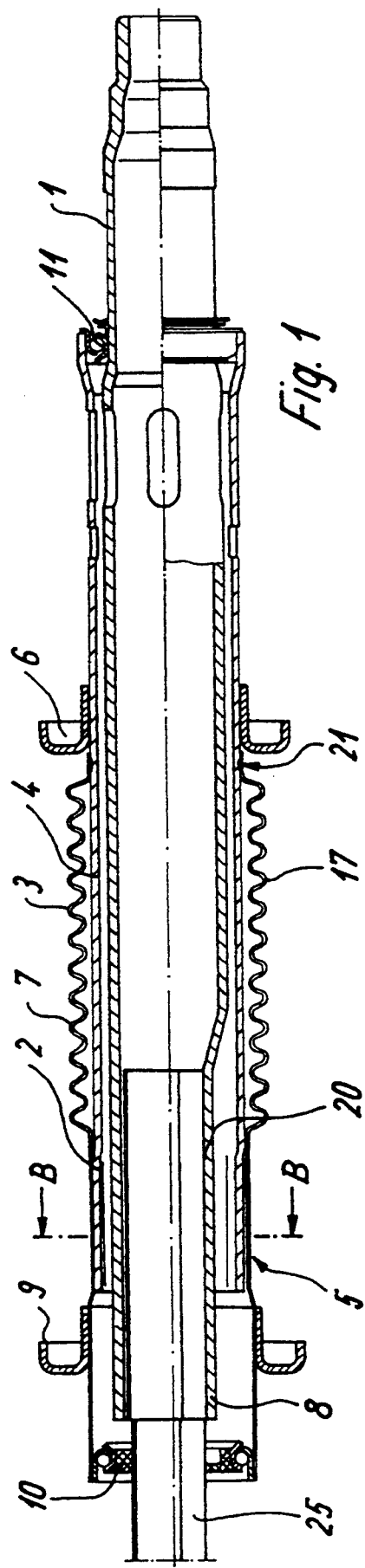
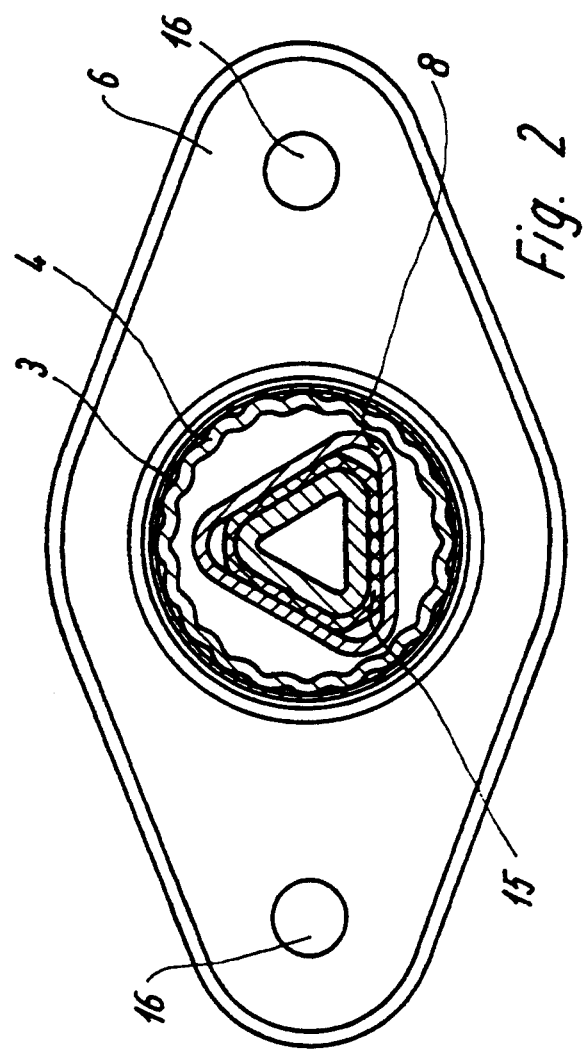

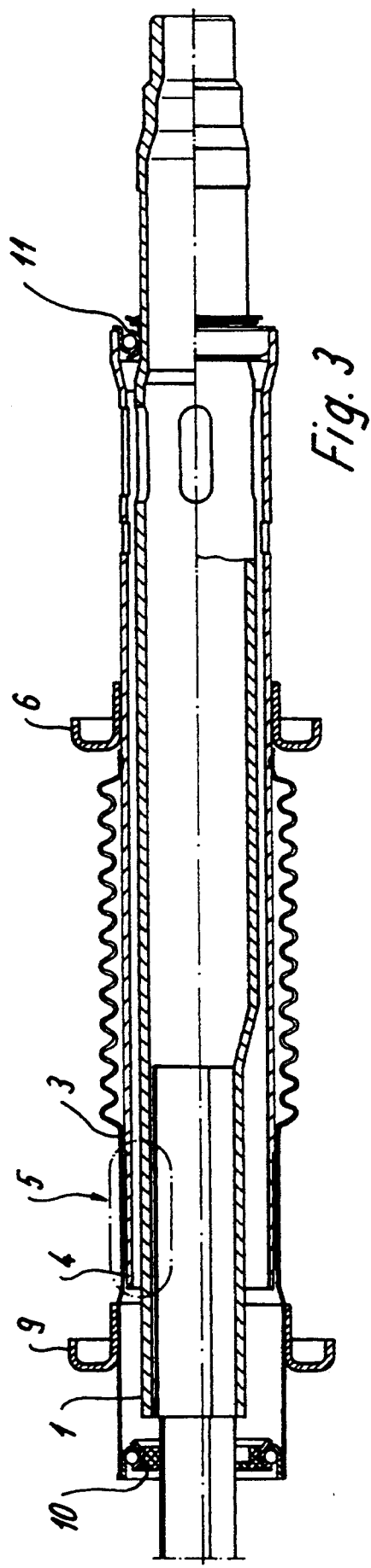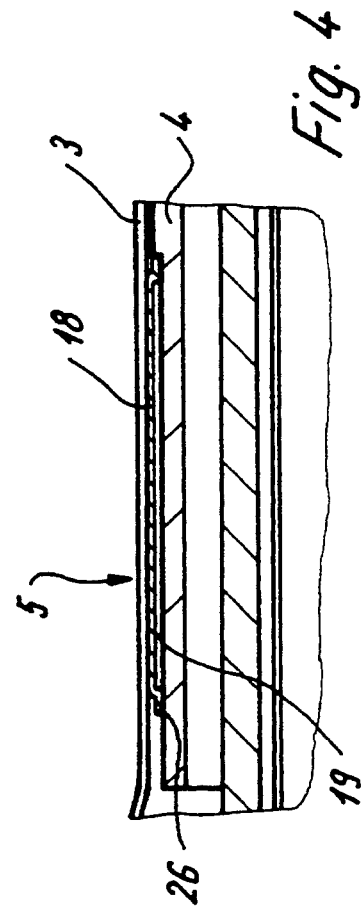

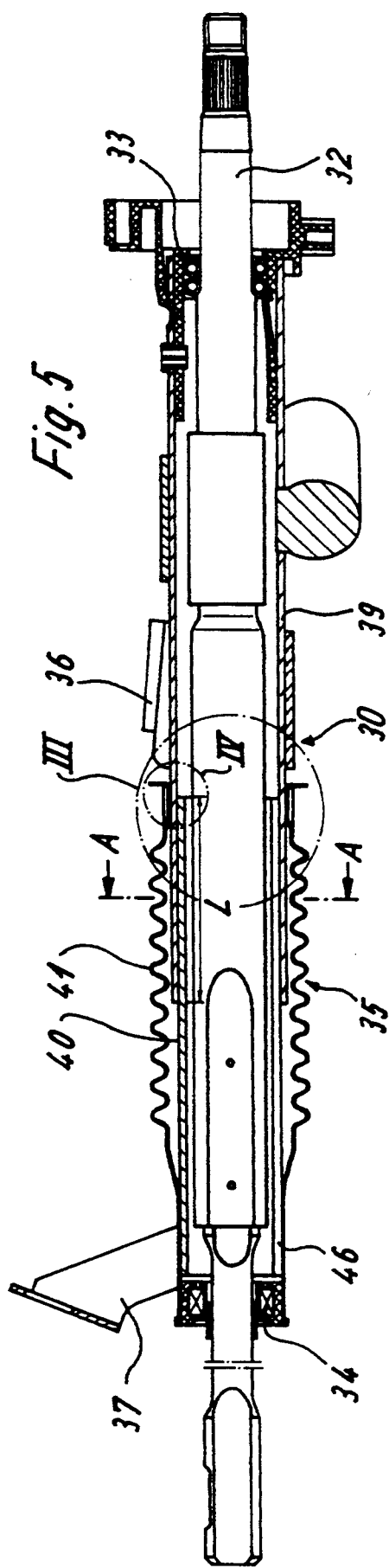
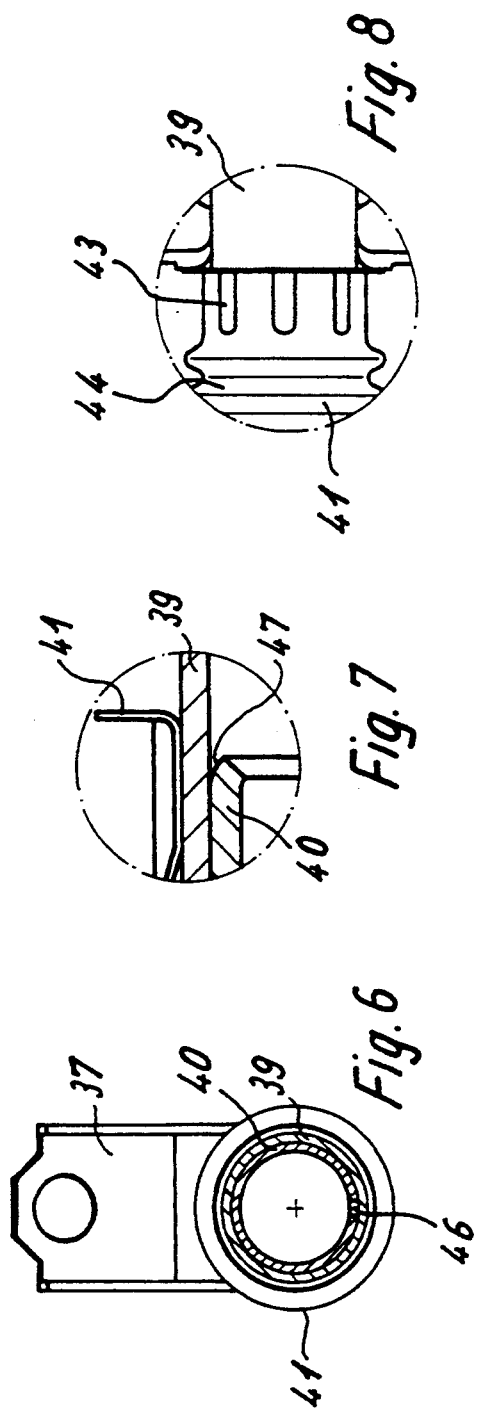

MOTOR VEHICLE STEERING COLUMN

BACKGROUND OF THE INVENTION

This invention is concerned with a rotating steering column having a deformation zone which is compressible in the axial direction.

Motor vehicle steering columns are usually equipped with a deformation zone to reduce the impact force of a driver hitting the steering wheel. These deforming zones collapse in an axial direction upon impact and absorb impact energy. A so-called corrugated tube has proved to be quite successful in the use for the deformation zone construction in motor vehicle steering columns.

In the scope of increasing the safety of motor vehicles such vehicles in the future will have, besides the safety belt, an airbag system installed in the steering wheel column. Because of the slanted installation of the steering column, the installation of the inflatable airbag causes an additional bending moment to act on it. This bending moment is transferred to the steering housing. Because of the presence of the corrugated deforming zone, the bending resistance of the steering housing is weakened.

BRIEF DESCRIPTION OF THE INVENTION

The object of the invention is to design the steering column so that sufficient bending moment resistance is developed to withstand the additional force from an installed inflatable airbag in case of impact.

In accordance with the invention, a reinforcing sleeve is inserted in the deformation zone of an outer tube of the steering column assembly. This increases the bending moment resistance of the steering column housing, while still maintaining the axial displacement (collapsibility) of the steering column in the case of impact. A longitudinal corrugated type structure of the connected sections of the outer tube and the reinforcing sleeve makes it possible during assembly to provide a radial snug bearing fit of the outer tube to the reinforcing sleeve.

The increase of the bending moment resistance as well as the elimination of the operational noise of the assembled unit can be achieved by having tile corrugated absorption sleeve encased inner steering column housing a telescopic sleeve be developed by fitting it with either an inner or outer support sleeve. The inner or outer support sleeve has a minimum overlapping length at least twice the outside diameter of the telescoping tube.

One tube of the inner housing telescopic tube support sleeve can be developed as a spring sleeve.

The use of a telescoping tube as the inner steering shaft leads, in high stressed cross-sectional areas to an increased size of the cross section, and thus to a decisive increase in the bending resistance of the steering shaft housing. The overlapping length of the inner or outer support sleeve is so chosen that the occurring bending forces can be safely controlled, whereby the overlap of the insert sleeve and an outer tube is positioned at the center of the steering column to give an advantageous bending moment resistance.

It is especially useful to cut a slot along the length of the insert sleeve thus making it into a spring sleeve. By exerting outside pressure the spring sleeve creates a snug fit with the outer tube, whereby the sliding action in the axial direction is not impaired. The snug slide fit eliminates noise during motor vehicle operation, since the shock absorption tube has the overlap location encased.

The inventive design of the motor vehicle steering column is such that at the end of the tubular corrugated collapsible section closer to the steering wheel, the section has end slits extending in an axial direction to serve as a connection between the telescoping outer tube and the collapsible section, thus giving a sort of sliding press-fit. This raises the natural frequency of the whole assembly. Consequently, resonance created oscillation of the unit is avoided.

BRIEF DESCRIPTION OF THE DRAWINGS

Further objects, advantages and features of the invention are apparent from the following drawings, in which:

FIG. 1 is a longitudinal section of the steering column of the invention.

FIG. 2 is a cross section of the steering column of FIG. 1 along line B—B.

FIG. 3 is a longitudinal view in cross-section of a further embodiment of a steering shaft.

FIG. 4 is an enlarged detail of the connection area of the outer tube and reinforce sleeve.

FIG. 5 is a longitudinal section of a variation of the steering shaft of FIG. 1.

FIG. 6 is a sectional cut along line A—A in FIG. 5.

FIG. 7 is a view of detail III in FIG. 5.

FIG. 8 is a view of detail IV in FIG. 5.

DETAILED DESCRIPTION OF THE INVENTION

As shown in FIG. 1 the motor vehicle steering column has an inner steering tube 1 supported in a steering column housing 2 by two roller bearings 10 and 11. The inner steering tube 1 also has an end sleeve 8 keyed onto a steering sleeve shaft 25 which leads to the vehicle steering mechanism. The end sleeve 8 at the section 20 engages with the steering sleeve 25 and allows axial displacement of the two relative to each other. FIG. 2 shows that at the overlapping point of the inner end sleeve 8 and the part 25, both have a triangular cross-section with a slide element 15 between them.

The steering column housing 2 has a reinforcing sleeve 4 and an outer tube 3 having a tubular corrugated zone 17 which collapsible. Sleeve 4 and tube 3 are fastened to the vehicle frame by two support brackets 6 and 9. Bracket 6 is connected to the reinforcing sleeve 4 and bracket 9 to the outer tube 3. Each of the brackets 6, 9 have two holes to accommodate screws 16 for mounting the bracket to the vehicle frame.

The reinforcing sleeve 4 is slipped into the outer tube 3 and the two are welded to each other at the location 21. There is a connecting area 5 between the outer tube 3 and the reinforcing sleeve 4 at the end of sleeve 4. FIG. 2 shows that the reinforcing sleeve 4 at the connection area 5 has longitudinal corrugations or crenalations extending along the column axis. The outer reaches the corrugations in area 5 touch the inside surface of the outer tube 3.

The outside diameter of the corrugated sleeve 4 is slightly larger than the inside diameter of the tube 3. The tube 3 is somewhat flexible so that during the assembly of the two it expands and snugly fits over the sleeve 4. This creates a radial tight slide fit but permits axial movement of the tube 3 relative to sleeve 4.

It is also possible to put the corrugation shown on the sleeve 4 on the inner surface of outer tube 3. Then the smooth outer surface of the reinforcing sleeve 4 would fit snugly to the inner reaches of the corrugation by having the outer diameter of the reinforcing sleeve 4 slightly larger than the inner diameter of the outer tube 3.

The automotive steering column of the embodiment shown in FIG. 3 corresponds in general to the steering column described for FIG. 1. Here, the connecting area 5, shown in detail in FIG. 4, includes a ring type bushing 18 between the outer tube 3 and the reinforcing sleeve 4. The bushing 18 has an inner depression 19. The areas 26 at the ends of the bushing on each side of depression 19 adjacent to the groove engage the outside of the reinforcing sleeve 4. The inside surface of the outer tube 3 rests on the outside surface of the bushing.

There can be other arrangements of the bushing 18, e.g., to have it formed as a sleeve with corrugations in the axial direction as described above placed at the connection area 5 between the reinforcing sleeve 4 and the outer tube 3.

If the steering shaft, in case of an accident, has to absorb forces in the axial direction, then the corrugated section 17 of the outer tube 3 in the deformation zone will be compressed by a certain amount. The length of the sliding zone between outer tube 3 and reinforcing sleeve 4 corresponds to the approximate maximum length that the corrugated section 17 can compress. Thus, there is always sufficient slide area available.

FIGS. 5–8 show another embodiment of the invention in which the motor vehicle steering column 30 has a steering shaft 32 which, with the support of the ball bearings 33, 34, is installed in a housing 35. The housing 35 is mounted by the support brackets 36 and 37 to the frame of the vehicle.

The housing 35 has an outer tube 39 of a cylindrical cross section and is formed with as a corrugated telescoping tube section 41 at the lower end. An insert sleeve 40 extends within the outer tube 39. The insert sleeve 40 is pushed into the outer tube 39 until it reaches a support-length, which is equal to twice the outside diameter of the outer tube 39. The end of the insert sleeve 40, which is inserted into the outer tube 39, is provided with a rounded off edge 47, as shown in FIG. 7.

The overlapping portion of the outer tube 39 and the insert sleeve 40 lies within the length of the corrugated collapsible tube outer section 41 which absorbs the impact energy in case of an accident. The corrugated structure of the absorption tube 41 is between the support brackets 36 and 37. The end of the collapsible section 41 adjacent to the bracket 37 is welded to the insert sleeve 40.

As shown in FIG. 8, the outer surface of the outer tube 39 adjacent the bracket 36 is connected to the inner surface of the compressible corrugated tube section 41. The end of collapsible tube section 41 has longitudinal slots 43 around its circumference. This slotted end of the absorption tube 41 terminates in a 90° flange 48 at the ends of the slits which is attached to the outer surface of the outer tube 39.

FIG. 6 shows a cross-sectional view at the overlap location between the outer tube 39 and the insert sleeve 40 at the support bracket 37. It is seen that the insert sleeve 40 has a partial slot 46 at the bottom. This slot 46, located at the lower part of bracket 37, starts from the beginning of the tube 39 inserted end, and ends at the beginning of bearing location 34 of the steering tube 32. Since the insert sleeve 40 is made of cold-rolled steel, this results in the tube 40 acting like a spring sleeve.

For the assembly of the steering shaft, the diameter of the insert sleeve 40 is somewhat reduced, so that the insertion into outer tube 39 is without complications. After insertion of sleeve 40, the slotted section 46 acting like a spring presses against the inner surface of outer tube 39, thus giving a snug radial fit, but still allowing easy axial slide capability.

We claim:

1. A motor vehicle steering column comprising:
    a fixedly mounted steering column housing having a section which compresses upon axially applied force,
    a turnable steering shaft disposed within said housing,
    said steering column housing having an outer tube and an inner reinforcing sleeve, said inner sleeve has one end fixedly mounted to said outer tube and the other end slidably mounted in an axial direction within the outer tube and in contact with said outer tube to prevent relative radial movement of said inner sleeve and said outer tube.

2. Motor vehicle steering column as in claim 1 wherein there is a connection between the outer tube and the reinforcing sleeve slidable end in the form of axially directed corrugations on one of said outer tube and said reinforcing sleeve.

3. Motor vehicle steering column as in claim 2 wherein said axial corrugations are on said reinforcing sleeve and the outside diameter of the said sleeve corrugations is somewhat larger than the inside diameter of the matching location of the outer tube.

4. Motor vehicle steering column as in claim 2 wherein said axial corrugations are on the inner surface of said outer tube and the inner diameter of the corrugations is slightly smaller than the outside diameter of the sleeve.

5. Motor vehicle steering column as in claim 1 further comprising a bushing between the tube and sleeve to provide bearing support of sleeve inside the outer tube.

6. Motor vehicle steering column as in claim 5 wherein the bushing has corrugations in the axial direction.

7. Motor vehicle steering column according to claim 1 wherein the axial displacement distance of the sleeve in regards to the outer tube substantially equals the length of the connection area of sleeve and tube.

8. Motor vehicle steering column as in claim 1 wherein the steering column housing comprises said outer tube to which a collapsible tubular section is attached, with the outer tube having a section disposed radially within the collapsible tube section, the inner reinforcing sleeve overlapping said section of said outer tube such that the overlap length of the inner reinforcing sleeve and said section of said outer tube being at least twice the diameter of the outer tube.

9. Motor vehicle steering column as in claim 8, wherein the reinforcing sleeve is a spring sleeve in the area where it engages said first tube.

10. Motor vehicle steering column as in claim 9, wherein the sleeve is slotted along the entire length of the portion which engages said first sleeve first section.

11. Motor vehicle steering column as in claim 10, wherein the spring sleeve is of cold-rolled steel.

12. Motor vehicle steering column as in claim 11, wherein the end of the collapsible tubular section fits around said outer tube and located towards the steering wheel, has axially directed slots to produce a press-slide slit.

13. Motor vehicle steering columns in claim 8, wherein the reinforcing sleeve is provided with a rounded-off edge.

* * * * *